United States Patent [19]
Takaki et al.

[11] Patent Number: 5,894,857
[45] Date of Patent: Apr. 20, 1999

[54] FUEL DELIVERY DEVICE OF FUEL TANK

[75] Inventors: Hiroshi Takaki; Shinya Shimada, both of Soja; Kunihito Kawai, Tokyo, all of Japan

[73] Assignee: OM Corporation, Okayama, Japan

[21] Appl. No.: 08/890,465

[22] Filed: Jul. 8, 1997

[30] Foreign Application Priority Data

Jul. 16, 1996 [JP] Japan .................................. 8-186273

[51] Int. Cl.$^6$ .................................................. F16K 21/18
[52] U.S. Cl. .................... 137/395; 137/565; 137/573; 123/514; 123/515; 123/516
[58] Field of Search .................... 137/565, 395, 137/574, 573, 575, 576; 123/514, 515, 516, 509

[56] References Cited

U.S. PATENT DOCUMENTS

| 2,297,238 | 9/1942 | Neugebauer et al. | 123/516 |
|---|---|---|---|
| 2,414,158 | 1/1947 | Mock | 123/516 |
| 2,599,699 | 6/1952 | Dilworth et al. | 123/514 |
| 4,279,232 | 7/1981 | Schuster et al. | 123/516 |
| 4,367,181 | 1/1983 | Hack, Jr. | 137/574 |
| 5,170,764 | 12/1992 | Tuckey | 123/514 |
| 5,389,245 | 2/1995 | Jaeger et al. | 123/516 |
| 5,447,175 | 9/1995 | Takaki et al. | |

*Primary Examiner*—Denise L. Ferensic
*Assistant Examiner*—John Ball
*Attorney, Agent, or Firm*—Koda & Androlia

[57] ABSTRACT

A fuel delivery device for a fuel tank comprising a float chamber for sucking fuel in a normal state, a sub chamber for sucking a small quantity of fuel remaining within a tank and a communication chamber for communicating the float chamber and the sub chamber to each other in lower portions thereof En the fuel delivery device for a fuel tank, a sub float chamber is provided above the sub chamber, the sub float chamber has a gas discharge port communicating with-the fuel tank in an upper portion, a vent hole communicating with the sub chamber in a lower portion and a sub float valve within, and the sub float valve ascends and descends in accordance with a quantity of an excess fuel returned to the sub float chamber from the engine so as to open and close the vent hole. Further, in the fuel delivery device for a fuel tank, a bypass passage having bent passage sections of down, up and down which is formed by arranging a lower separation wall having a gap in an upper portion with respect to a communication passage for feeding out fuel from the sub chamber to the communication chamber and an upper separation wall having a gap in a lower portion with respect to the communication passage in order is formed within the sub chamber and the bypass passage and the communication passage are connected to each other.

3 Claims, 4 Drawing Sheets

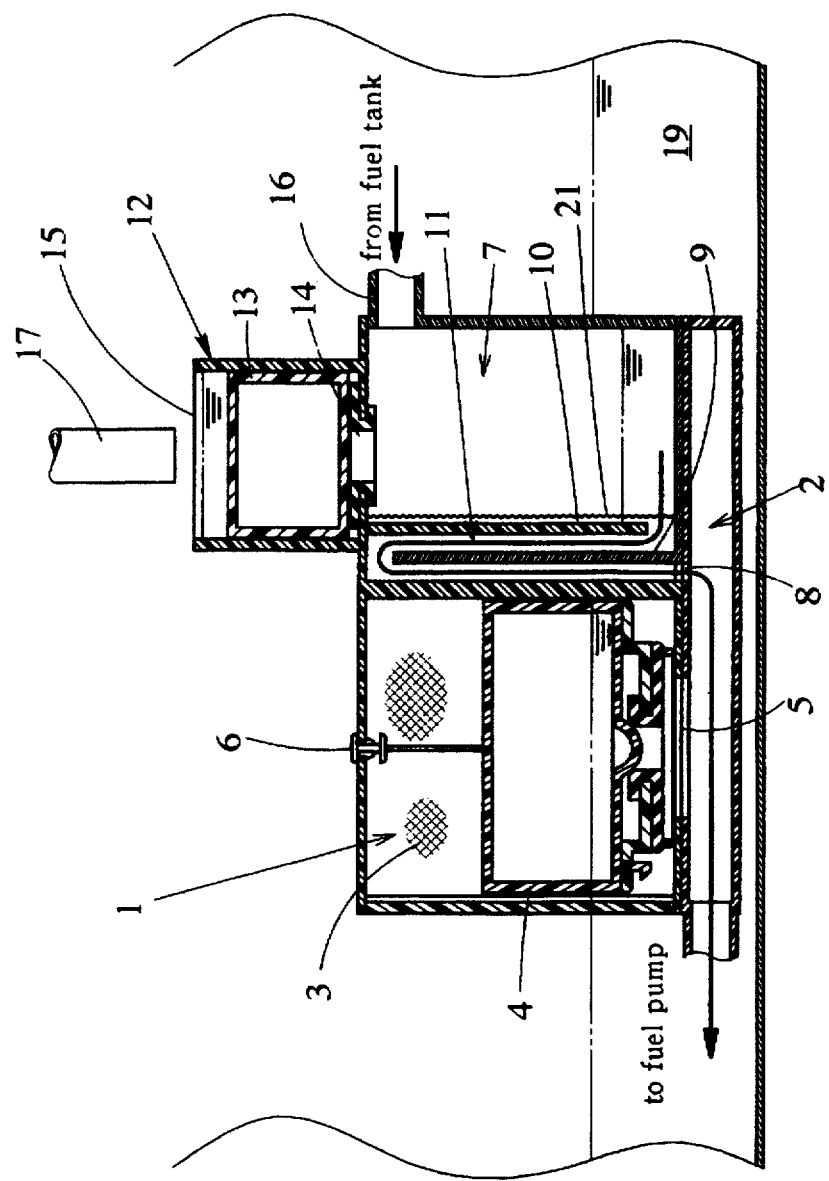

FUEL DELIVERY DEVICE OF FUEL TANK

BACKGROUND OF THE INVENTION

1. Field of the Invention

The present invention relates to a fuel delivery device of a fuel tank for a vehicle, which supplies fuel to an engine.

2. Prior Art

A conventional fuel delivery device comprises, for example as shown in U.S. Pat. No. 5,447,175, a float chamber having a float valve within, a sub chamber having a mesh filter within and a communication chamber for communicating therebetween. When the fuel in the fuel tank is sufficient, since the float valve comes up and a main fuel introduction inlet is opened so that the float chamber and the communication chamber are communicated to each other, the fuel within the fuel tank is sucked to the communication chamber and a fuel pump through the float chamber and further is supplied to the engine. However, when the fuel is decreased, the float valve comes down and the main fuel introduction inlet is closed so that the suction force by the fuel pump is applied to the sub chamber and a small quantity of fuel remaining in the fuel tank is sucked through a fuel suction conduit so as to be introduced to the sub chamber, thereafter the fuel sucked from the sub chamber to the communication chamber and the fuel pump is supplied to the engine.

In the example disclosed in U.S. Pat. No. 5,447,175, a function of the float valve within the float chamber is mainly improved and no particular attention has been given to the sub chamber. However, immediately after the suction of the fuel to the communication chamber is switched from the float chamber to the sub chamber, air (containing a gasified fuel) collected in the sub chamber is sucked to the communication chamber and is often fed to the fuel pump and the engine. Further, after the fuel is sucked from the fuel suction conduit, air comes into the sub chamber together with the fuel and the air is sucked to the communication chamber in a similar manner to that in the above case so that there is a risk that air is supplied to the fuel pump and further to the engine. This means that an appropriate mixture of fuel and air can not supplied with respect to the engine and this causes a trouble in an output of the engine.

Since a small quantity of fuel remaining in the fuel tank is sucked to the sub chamber, it is easily expected that air is sucked to the sub chamber together with the fuel. However, it is difficult to suck only the fuel with completely removing the air and if it is desired to achieve this, this achievement causes an increase of a cost. Since the more the fuel tank becomes flat, the more the fuel suction at a time when the liquid surface of the fuel is swung fuel sucking (to the engine) becomes unstable, such a suction of air easily occurs.

SUMMARY OF THE INVENTION

Accordingly, on the assumption that air is sucked to the sub chamber, the inventors consider a structure of the sub chamber which can reduce an amount of air sucked to the sub chamber by filling the sub chamber with fuel as much as possible and further can deliver the sucked air to the communication chamber as little as possible. As a result of this, the inventors decide to develop a fuel delivery device which can stably and continuously suck fuel even if a liquid surface particularly in a flat fuel tank is swung.

As a result of consideration, with an eye to reducing an amount of air sucked to the sub chamber by filling the sub chamber with fuel as much as possible, the following fuel delivery device is developed. Accordingly, there is provided a fuel delivery device comprising a float chamber for sucking fuel in a normal state, a sub chamber for sucking a small quantity of fuel remaining within a tank and a communication chamber for communicating the float chamber and the sub chamber to each other in lower portions thereof, wherein a sub float chamber is provided above the sub chamber, the sub float chamber has a gas discharge port communicating with the fuel tank in an upper portion, a vent hole communicating with the sub chamber in a lower portion and a sub float valve within, and the sub float valve ascends and descends in accordance with a quantity of an excess fuel returned to the sub float chamber from the engine so as to open and close the vent hole.

For example, the sub float chamber having the sub float valve within is mounted to an upper surface of the sub chamber, the vent hole for communicating the sub float chamber and the sub chamber with each other is provided on the upper surface of the sub chamber which also serves as a lower surface of the sub float chamber and the upper surface of the sub float chamber is opened to form the gas discharge port. It is preferable that the gas discharge port serves as a suction port for the excess fuel.

The sub float valve is structured such that when an amount of the excess fuel returned to and stored in the sub float chamber is small or a suction force by the fuel pump applied to the sub chamber is strong (when the fuel suction to the communication chamber is switched from the float chamber to the sub chamber or the like), the sub float valve is submerged under fuel so as to close the vent hole, and that when the stored amount becomes over a predetermined value and the suction force by the fuel pump applied to the sub chamber is weak (when the fuel suction to the communication chamber is mainly from the float chamber or the like), the sub float valve comes up to the fuel surface so as to open the vent hole. When the vent hole for communicating the sub float chamber and the sub chamber with each other is opened in this way, the excess fuel stored in the sub float chamber drops to the sub chamber so that this dropped excess fuel drives out the air within the sub chamber through the vent hole to the sub float chamber and further drives out through the vent hole in the sub float chamber to the fuel tank.

In addition to this, as a fuel delivery device having a sub chamber which feed out a sucked air to the communication chamber as little as possible, the inventors develops the following device. Accordingly, there is provided a fuel delivery device comprising a float chamber for sucking fuel in a normal state, a sub chamber for sucking a small quantity of fuel remaining within a tank and a communication chamber for communicating the float chamber and the sub chamber to each other in lower portions thereof, wherein a bypass passage having bent passage sections of down, up and down which is formed by arranging a lower separation wall having a gap in an upper portion with respect to a communication passage for feeding out fuel from the sub chamber to the communication chamber and an upper separation wall having a gap in a lower portion with respect to the communication passage in order is formed within the sub chamber and the bypass passage and the communication passage are connected to each other. In feeding out the fuel from the sub chamber to the communication chamber, when the fuel passes in the bypass passage, air having a specific gravity smaller than that of the fuel can not submerge into the fuel stored in the sub chamber and can not enter into the bypass passage so that air can not be sucked into the communication chamber.

If the above-mentioned sub float chamber and the sub chamber having the bypass passage are combined, in order to reach the communication passage from the sub chamber, it is necessary to pass the bypass passage having down, up and down bent portions which is formed by the upper separation wall and the lower separation wall. Accordingly, in a state of no suction force, the fuel can not be fed out so that the fuel is stored in the sub chamber.

The fuel stored in the sub chamber in the above manner makes a space in which air is possibly sucked and stored small and in addition to this, when the suction of fuel from the sub chamber to the communication chamber is started, the fuel is at first fed out to the communication chamber so that a time lag for supplying the fuel is removed. Accordingly, before the fuel is sucked from the fuel suction conduit to the sub chamber, it is made that air is not fed out as much as possible.

BRIEF DESCRIPTION OF THE DRAWINGS

FIG. 4 is a cross sectional view of the fuel delivery device corresponding to FIG. 2 which shows a state in which a suction of the excess fuel stored in the sub chamber is completed from the state shown in FIG. 3, a small amount of fuel remaining within the fuel tank is newly sucked from a fuel suction conduit and the fuel is sucked into the communication chamber.

DETAILED DESCRIPTION OF THE PREFERRED EMBODIMENTS

Figure 1:
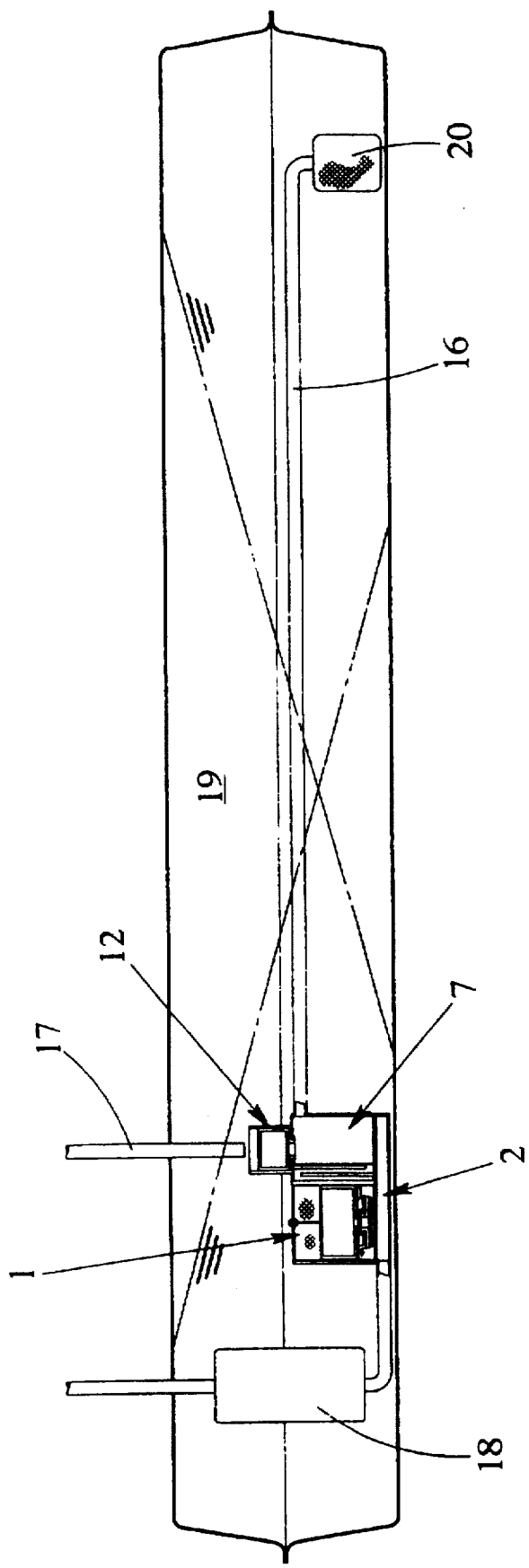
FIG. 1 is a cross sectional view of an embodiment in which a fuel delivery device in accordance with the present invention is provided within a flat fuel tank.

An embodiment of the present invention will be explained below with reference to the attached drawings. A fuel delivery device is disposed near an end portion within a flat fuel tank 19 in a state that a fuel pump 18 is connected to a communication chamber 2 and has a fuel suction conduit 16 which includes a filter 20 on a front end thereof and extends from a sub chamber 7 to another end of the fuel tank 19, as shown in FIG. 1. As shown in a dotted chain line in FIG. 1, when a liquid surface of fuel is swung in a right and left direction, in the case that the fuel inclines toward a left side in FIG. 1, the fuel is sucked from a float chamber 1, and in the case that the fuel inclines toward a right side in FIG. 1, the fuel is sucked to the sub chamber 7 through the fuel suction conduit 16. The more the fuel tank 19 is flat, the greater a distance between the float chamber 1 and the filter 20 is so that a large amount of air is easily stored in the fuel suction conduit 16 having a long size. Accordingly, when a suction of fuel is switched from the float chamber 1 to the sub chamber 7, the air can be easily sucked. In accordance with the present invention, when a portion from which the fuel is sucked is switched from the float chamber 1 to the sub chamber 7, a suction of air from the sub chamber 7 to the communication chamber 2 can be prevented and an intermission of fuel supply which was generated in a conventional device can be removed so that a capacity of stably and continuously supplying fuel can be obtained. Particularly, when the fuel delivery device in accordance with the present invention is applied to the flat fuel tank 19, the above effects and advantages are significantly obtained.

Figure 2:
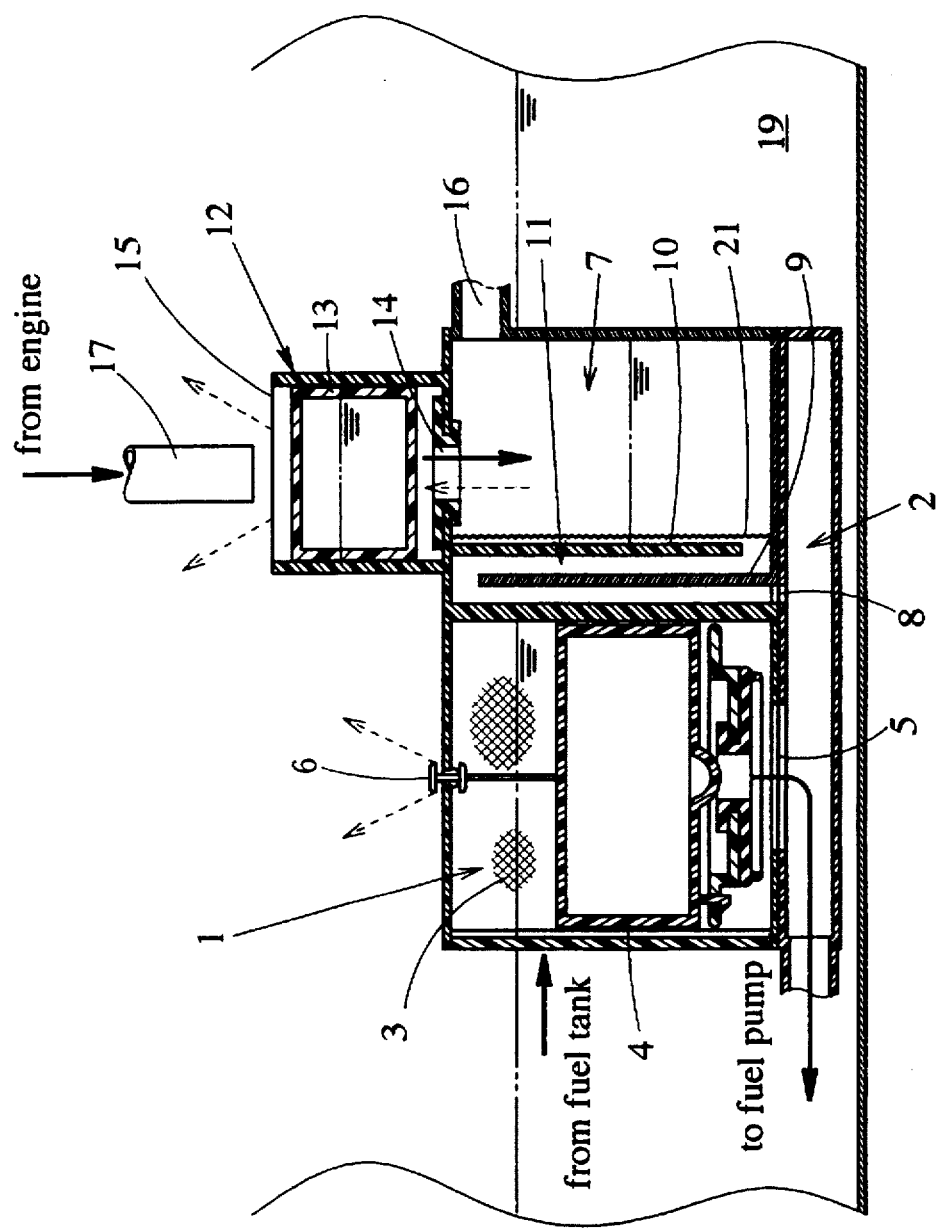
FIG. 2 is a cross sectional view of the fuel delivery device which shows a state in which the fuel is sucked from a float chamber to a communication chamber because a large amount of fuel remains within the fuel tank (not shown)

A structure of the fuel delivery device will be explained with reference to FIG. 2. The float chamber 1 sucks the fuel from the fuel tank 19 through a wall surface 3 having a mesh filter. In the case that the fuel sufficiently exists within the fuel tank 19 or in the case that the liquid surface is swung to incline toward a left side in FIG. 1, a float valve 4 provided within the float chamber 1 rises to the surface so that a main fuel suction port 5 corresponding to a communication passage with the communication chamber 2 is opened. Incidentally, the air sucked into the float chamber 1 is discharged to the fuel tank 19 by a check valve 6 provided in an upper surface of the float chamber 1.

The sub chamber 7 is provided with a bypass passage 11 having bent passage sections of down, up and down which is formed by arranging a lower separation wall 9 having a gap in an upper portion with respect to a sub fuel suction port 8 corresponding to a communication passage with the communication chamber 2 and an upper separation wall 10 having a gap in a lower portion with respect to the sub fuel suction port 8 in order. A sub float chamber 12 is disposed on the upper surface of the sub chamber 7, has a sub, float valve 13 within and is provided with a vent hole 14 communicating with the sub chamber 7 in the lower surface thereof and with a gas discharge port 15 (corresponding to a suction port for an excess fuel) wholly opened in the upper surface thereof. When the excess fuel returned from the engine (not shown) is stored in the sub float chamber 12 at an amount more than a predetermined degree, the sub float valve 13 rises to the surface so as to open the vent hole 14 so that the excess fuel stored in the sub float chamber 12 drops to the sub chamber 7. The air within the sub chamber 7 is driven out by the excess fuel dropped to the sub chamber 7, thereby passing through the vent hole 14 to enter the sub float chamber 12 and then is discharged to the fuel tank 19 through the gas discharge port 15. The fuel sucked from the fuel suction conduit 16 to the sub chamber 7 or the excess fuel dropped from the sub float chamber 12 passes through a mesh filter provided within the sub chamber 7 to enter the bypass passage 11 and then passes through the sub fuel suction port 8 so as to be sucked to the chamber 2.

In the case that an amount of the fuel remaining within the fuel tank is large, a suction of fuel to the communication chamber 2 by using a negative pressure is mostly performed by a suction from the float chamber 1. As shown in FIG. 2, the fuel flowing from the wall surface 3 to the float chamber 1 rises the float valve 4 to the surface, thereby opening the main fuel suction port 5 and the fuel is sucked to the chamber 2. Since the air within the float chamber 1 is discharged within the fuel tank through the check valve 6, the air is not sucked to the chamber 2 (refer to an arrow by a dotted line extending from the check valve 6 in FIG. 2). In the sub chamber 7, every time the excess fuel returned from a return pipe 17 is stored in the sub float chamber 12 at a predetermined amount, the sub float valve 13 rises to the surface to open the vent hole 14 so that the excess fuel stored in the sub float chamber 12 drops to the sub chamber 7 and is stored. Simultaneously, the air within the sub chamber 7 is driven out to the sub float chamber 12 through the vent hole 14 and thereafter is discharged to an inner space of the fuel tank 19 through the gas discharge port 15 (refer to an arrow by a dotted line described in upper and lower portions of the sub float chamber 12 in FIG. 2).

Figure 3:
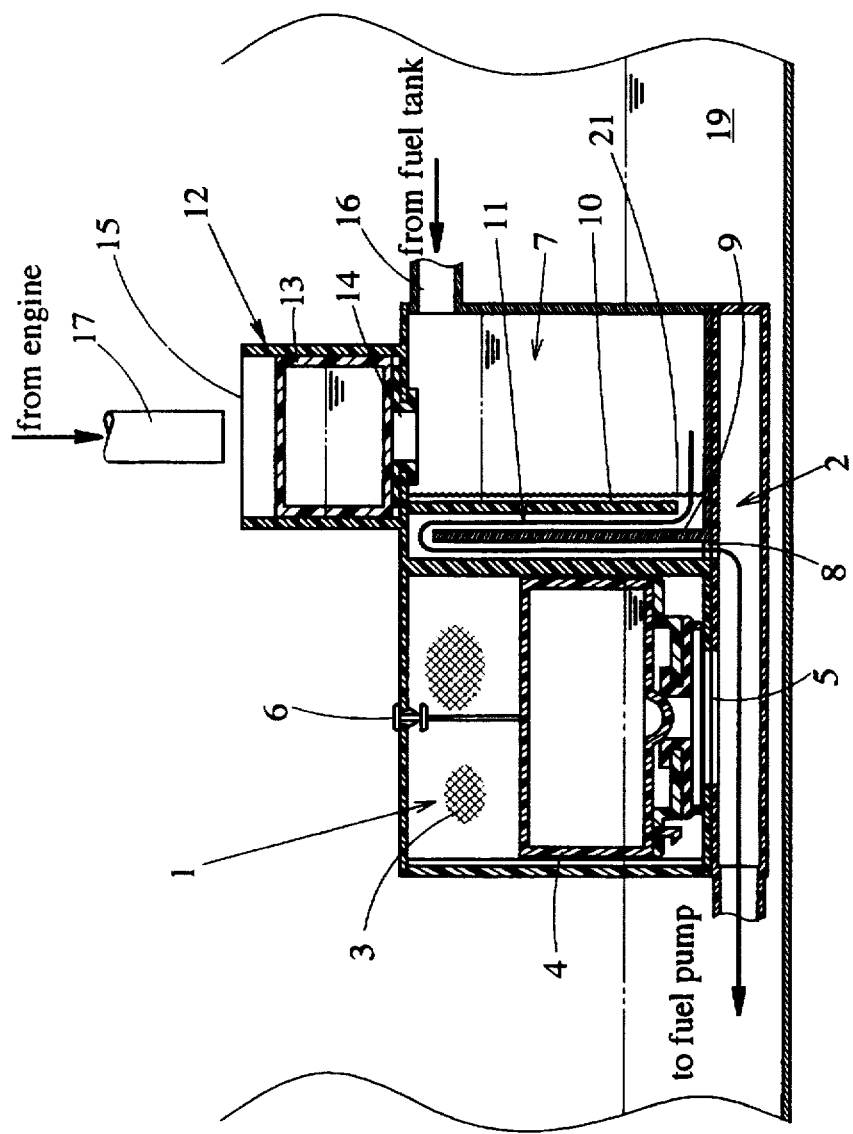
FIG. 3 is a cross sectional view of the fuel delivery device corresponding to FIG. 2 which shows a state in which the fuel is sucked from a sub chamber to the communication chamber because the fuel remaining within the fuel tank is reduced and a main suction of fuel is switched from the float chamber to the sub chamber.

When the fuel remaining within the fuel tank 19 is decreased, the liquid surface of the fuel in the float chamber 1 is lowered in company with the decrease as shown in FIG. 3 so that buoyancy generated in the float valve 4 become smaller than the suction force by the communication chamber 2 and then the float valve 4 is submerged. Accordingly, the main fuel suction port 5 is closed so that the portion from which the fuel in the communication chamber 2 is sucked is switched from the float chamber 1 to the sub chamber 7. In the sub chamber 7, since no valve is provided in the sub fuel suction port 8, the negative pressure in the communication chamber 2 is applied to the sub float valve 13. Accordingly, in a similar manner to the case of the float valve 4, the sub float valve 13 drawn to the vent hole 14 closes the vent hole 14, thereby securing a sealing performance of the sub chamber 7 so as to certainly perform the suction of the fuel. After this operation, the excess fuel exceeding the volume of the sub float chamber 12 overflows from the gas discharge port 15 and is returned to the inside space of the fuel tank 19 so as to be sucked to the sub chamber 7 through the fuel suction conduit 16. Further, after the fuel tank is again filled with the fuel and the suction of the fuel to the communication chamber 2 is switched to be returned to the float chamber 1 from the sub chamber 7, the excess fuel remaining within the sub float chamber 12 drops to the sub chamber 7 by opening the vent hole 14 by means of the sub float valve 13. Accordingly, the excess fuel remaining within the sub float chamber 12 does not come to nothing.

Immediately after the portion from which the fuel is sucked is switched from the float chamber 1 to the sub chamber 7, a certain time is required before the fuel suction conduit 16 sucks the fuel to the sub chamber 7 and further at first the air remaining within the fuel suction conduit 16 is sucked into the sub chamber 7. However, since in the sub chamber 7, the excess fuel returned from the engine is stored, the excess fuel is sucked to the communication chamber 2 through the bypass passage 11. In this time, although the air remains within the sub chamber 7 in no small quantities, there is almost no risk that the air having a specific gravity smaller than that of the fuel is submerged into the excess fuel to enter the bypass passage 11 and further passes through the sub fuel suction port 8 disposed in front of the bypass passage 11 to reach the communication chamber 2 because the lower portion of the sub chamber 7 and the whole area of the bypass passage 11 are filled with the sucked excess fuel. Accordingly, the bypass passage 11 filled with the fuel serves as a wall against the air within the sub chamber 7 so that the suction to the communication chamber 2 can be prevented.

When the suction of the excess fuel stored in the sub chamber 7 is finished from the state shown in FIG. 3, the fuel is not stored in the sub float chamber 12. Accordingly, the sub float valve 13 is kept closing the vent hole 14 so that the negative pressure applied to the sub chamber 7 sucks the fuel remaining in the fuel tank together with the air within the fuel tank 19 to the sub chamber 7 through the fuel suction conduit 16. However, as far as the fuel sucked to the communication chamber 2 fills the bypass passage 11, even if the air is sucked to the sub chamber 7, the suction of the air to the communication chamber 2 can be prevented for the above reasons. Since the fuel is supplied to the bypass passage 11 as far as the fuel suction conduit 16 can suck the fuel to the sub chamber 7, the above effect of preventing the suction of the air can be maintained, and further since the fuel can be sucked to the communication chamber 2 at least prior to the air, the fuel can be supplied in a stable manner.

As mentioned above, in accordance with the fuel delivery device of the present invention, firstly the excess fuel is stored in the sub chamber and secondly the fuel is sucked from the sub chamber to the communication chamber through the bypass passage. Accordingly, the fuel delivery device of the present invention can obtain the following advantages:

(1) A total amount of air possibly sucked to the communication chamber is reduced by reducing the amount of the air remaining in the sub chamber at a time when the suction of the fuel to the communication chamber is switched from the float chamber to the sub chamber;

(2) The communication chamber does not suck the air as much as possible by shutting off the air remaining within the sub chamber by means of the fuel sucked through the bypass passage so as not to suck the air to the communication chamber; and (3) A time lag for supplying the fuel is removed by sucking the stored fuel to the communication chamber during the suction of the fuel to the sub chamber by the fuel suction conduit.

In accordance with the present invention, these operation can be realized in a low cost and in a simple structure.

In accordance with the fuel delivery device of the present invention, the suction of the air to the communication chamber is completely prevented and further the time lag for supplying the fuel at a time immediately after the suction portion of the fuel is switched from the float chamber to the sub chamber is removed so that the stable and certain supply of the fuel can be realized. The effect due to this stable supply of the fuel significantly appears in the flat fuel tank which is easily effected by the swing motion of the liquid surface. This is because with aiming at the sub chamber which has a possibility of sucking the air, the amount of the air remaining in the sub chamber is reduced by using the excess fuel returned from the engine and further the air is shut off by sucking the excess fuel stored in the sub chamber through the bypass passage. Accordingly, a reliable effect can be obtained while using a simple structure.

The feature of the fuel delivery device in accordance with the present invention is in a point that the above described effects are realized by improving the structure of the sub chamber. The fuel delivery device as a subject of the present invention is an assembly to which a great attention is given with respect to a cost limitation so that it is necessary to reduce a cost for operation and a cost for maintenance in addition to reducing the manufacturing cost. The sub float valve has a simple structure, a narrow area for operation and a simple motion so that there is no risk of troubling. The bypass passage can be simply manufactured so that no new process is required. Accordingly, an increase of the above costs can be prevented. As mentioned above, the present invention is excellent in effects with respect to costs as an assembly presently used.

What is claim is:

1. A fuel delivery device for a fuel tank comprising:

a float chamber for sucking fuel in a normal state;

a sub chamber for sucking a small quantity of fuel remaining within a tank; and a communication chamber for communicating said float chamber and said sub chamber to each other in lower portions thereof, wherein a sub float chamber is provided above the sub chamber, said sub float chamber has a gas discharge port communicating with the fuel tank in an upper portion, a vent hole communicating with the sub chamber in a lower portion and a sub float valve within, and the sub float valve ascends and descends in accordance with a quantity of an excess fuel returned to the sub float chamber from the engine so as to open and close the vent hole.

2. A fuel delivery device for a fuel tank according to claim 1, wherein the sub float chamber having the sub float valve within is mounted to an upper surface of the sub chamber, the vent hole for communicating the sub float chamber and the sub chamber with each other is provided on the upper surface of the sub chamber which also serves as a lower surface of said sub float chamber and the upper surface of said sub float chamber is opened to form the gas discharge port.

3. A fuel delivery device for a fuel tank comprising:

a float chamber for sucking fuel in a normal state;

a sub chamber for sucking a small quantity of fuel remaining within a tank; and a communication chamber for communicating said float chamber and said sub chamber to each other in lower portions thereof, wherein a sub float chamber is provided above the sub chamber, a bypass passage having bent passage sections of down, up and down which is formed by arranging a lower separation wall having a gap in an upper portion with respect to a communication passage for feeding out fuel from the sub chamber to the communication chamber and an upper separation wall having a gap in a lower portion with respect to the communication passage in order is formed within the sub chamber, said sub float chamber has a gas discharge port communicating with the fuel tank in an upper portion, a vent hole communicating with the sub chamber in a lower portion and a sub float valve within, and the sub float valve ascends and descends in accordance with a quantity of an excess fuel returned to the sub float chamber from the engine so as to open and close the vent hole, and said bypass passage is connected to said communication passage.

* * * * *